United States Patent
Dong et al.

(10) Patent No.: US 11,341,322 B2
(45) Date of Patent: May 24, 2022

(54) TABLE DETECTION IN SPREADSHEET

(71) Applicant: Microsoft Technology Licensing, LLC, Redmond, WA (US)

(72) Inventors: Haoyu Dong, Beijing (CN); Shi Han, Beijing (CN); Zhouyu Fu, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/057,097

(22) PCT Filed: Jun. 17, 2019

(86) PCT No.: PCT/US2019/037414
§ 371 (c)(1),
(2) Date: Nov. 19, 2020

(87) PCT Pub. No.: WO2020/005605
PCT Pub. Date: Jan. 2, 2020

(65) Prior Publication Data
US 2021/0209297 A1   Jul. 8, 2021

(30) Foreign Application Priority Data
Jun. 29, 2018   (CN) .......................... 201810698750.9

(51) Int. Cl.
*G06F 40/00* (2020.01)
*G06F 40/18* (2020.01)
*G06F 40/106* (2020.01)

(52) U.S. Cl.
CPC ............ *G06F 40/18* (2020.01); *G06F 40/106* (2020.01)

(58) Field of Classification Search
CPC ................................ G06F 40/18; G06F 40/106
See application file for complete search history.

(56) References Cited

U.S. PATENT DOCUMENTS 5,613,131 A    3/1997  Moss et al.
8,433,714 B2 *  4/2013  Mohan ................... G06F 40/18
                                                707/756
(Continued)

FOREIGN PATENT DOCUMENTS

WO       2012017056 A1    2/2012
WO    WO 2012/017056   *  2/2012

OTHER PUBLICATIONS

"Ideas in Excel", Retrieved From https://support.microsoft.com/en-ie/office/ideas-in-excel-3223aab8-f543-4fda-85ed-76bb0295ffc4?ui=en-us&rs=en-ie&ad=ie, Apr. 12, 2018, 9 Pages.
(Continued)

*Primary Examiner* — Scott T Baderman
*Assistant Examiner* — Barbara M Level
(74) *Attorney, Agent, or Firm* — Schwegman Lundberg & Woessner, P.A.

(57) ABSTRACT

The subject matter described herein relates to table detection in a spreadsheet. According to implementations of the subject matter described herein, there is proposed a solution for determining a table in a spreadsheet. In the solution, respective multiple attributes of multiple cells comprised in the spreadsheet may be extracted. Respective features of the multiple cells may be determined based on the extracted multiple attributes. The multiple cells may be divided into at least one candidate area based on the features. At least one candidate table in the spreadsheet may be determined based on the at least one candidate area. By means of the solution, respective features of the multiple cells comprised in the spreadsheet may be determined based on the respective attributes of the multiple cells, and further, a candidate region where a table might exist may be determined based on the respective features of the multiple cells.

13 Claims, 10 Drawing Sheets

(56) References Cited

U.S. PATENT DOCUMENTS

| | | | | |
|---|---|---|---|---|
| 10,366,156 | B1* | 7/2019 | Krappe | G06F 40/186 |
| 11,023,671 | B2* | 6/2021 | Chou | G06F 40/18 |
| 2005/0273695 | A1* | 12/2005 | Schnurr | H04W 24/00 |
| | | | | 715/213 |
| 2006/0167911 | A1* | 7/2006 | Le Cam | G06F 40/18 |
| 2010/0169758 | A1* | 7/2010 | Thomsen | G06F 40/18 |
| | | | | 715/212 |
| 2010/0257439 | A1* | 10/2010 | Xue | G06F 40/18 |
| | | | | 715/217 |
| 2011/0029852 | A1* | 2/2011 | Naibo | G06F 40/18 |
| | | | | 715/212 |
| 2013/0346844 | A1* | 12/2013 | Graepel | G06F 40/226 |
| | | | | 715/219 |
| 2014/0358828 | A1* | 12/2014 | Phillipps | G06N 20/20 |
| | | | | 706/12 |
| 2014/0372851 | A1 | 12/2014 | Rutherford et al. | |

OTHER PUBLICATIONS

Hosang, et al., "What Makes for Effective Detection Proposals?", In Proceedings of the IEEE Transactions on Pattern Analysis and Machine Intelligence, vol. 38, Issue 4, Apr. 2016, pp. 814-830.

Chen, et al., "Automatic Web Spreadsheet Data Extraction", In Proceedings of the 3rd International Workshop on Semantic Search over the Web, Aug. 30, 2013, 8 pages.

Chen, et al., "Spreadsheet Property Detection With Rule-assisted Active Learning", Proceedings of the ACM on Conference on Information and Knowledge Management, Nov. 6, 2017, 10 Pages.

Dong, et al., "TableSense: Spreadsheet Table Detection with Convolutional Neural Networks", In Proceedings of the AAAI Conference on Artificial Intelligence, Aug. 2019, pp. 69-76.

Fang, et al., "Table Header Detection and Classification", In Proceedings of the 26th AAAI Conference on Artificial Intelligence, Jul. 22, 2012, pp. 599-605.

Gatos, et al., "Automatic Table Detection in Document Images", In Proceedings of the International Conference on Pattern Recognition and Image Analysis, Aug. 22, 2005, 10 Pages.

Girshick, Ross, "Fast R-CNN", In Proceedings of the IEEE International Conference on Computer Vision, Dec. 7, 2015, pp. 1440-1448.

Girshick, et al., "Rich Feature Hierarchies for Accurate Object Detection and Semantic Segmentation", In Proceedings of the IEEE Conference on Computer Vision and Pattern Recognition, Jun. 23, 2014, pp. 580-587.

He, et al., "Deep Residual Learning for Image Recognition", In Proceedings of IEEE Conference on Computer Vision and Pattern Recognition, Jun. 27, 2016, pp. 770-778.

He, et al., "Mask R-CNN", In Proceedings of Computer Vision and Pattern Recognition, Oct. 22, 2017, pp. 2980-2988.

Hu, et al., "Medium-Independent Table Detection", In Proceedings of International Society for Optics and Photonics, In Document Recognition and Retrieval VII, Dec. 22, 1999, 12 Pages.

Krizhevsky, et al., "ImageNet Classification with Deep Convolutional Neural Networks", In Advances in Neural Information Processing Systems, Dec. 2012, 9 Pages.

Lecun, et al., "Backpropagation Applied to Handwritten Zip Code Recognition", In Journal of Neural Computation, vol. 1, Issue 4, Dec. 1989, pp. 541-551.

Lewis, et al., "Heterogeneous Uncertainty Sampling for Supervised Learning", In Proceedings of the Eleventh International Conference on Machine Learning, Jul. 9, 1994, pp. 148-156.

Liu, et al., "Identifying Table Boundaries in Digital Documents via Sparse Line Detection", In Proceedings of the 17th ACM Conference on Information and Knowledge Management, Oct. 26, 2008, pp. 1311-1320.

Liu, et al., "TableSeer: Automatic Table Metadata Extraction and Searching in Digital Libraries", In Proceedings of the 7th ACM/IEEE-CS Joint Conference on Digital Libraries, Jun. 18, 2007, pp. 91-100.

"International Search Report and Written Opinion issued in PCT Application No. PCT/US19/037414", dated Sep. 2, 2019, 13 Pages.

Ren, et al., "Faster R-CNN: Towards Real-Time Object Detection with Region Proposal Networks", In Advances in Neural Information Processing Systems, Dec. 7, 2015, pp. 1-9.

Settles, Burr, "Active Learning Literature Survey", In Technical Report 1648 of Computer Sciences, University of Wisconsin—Madison, Jan. 26, 2010, 67 Pages.

Shafait, et al., "Table Detection in Heterogeneous Documents", In Proceedings of 9th IAPR International Workshop on Document Analysis Systems, Jun. 9, 2010, pp. 65-72.

Tomanek, et al., "Reducing Class Imbalance during Active Learning for Named Entity Annotation", In Proceedings of the Fifth International Conference on Knowledge Capture, Sep. 1, 2009, pp. 105-112.

Uijlings, et al., "Selective Search for Object Recognition", In International Journal of Computer Vision, vol. 104, Issue 2, Sep. 2013, 14 Pages.

Wang, et al., "Understanding Tables on the Web, In Proceedings of the 31st International Conference on Conceptual Modeling", Oct. 15, 2012, 10 Pages.

Wang, et al., "A Machine Learning Based Approach for Table Detection on the Web", In Proceedings of the 11th International Conference on World Wide Web, May 7, 2002, pp. 242-250.

Zhai, et al., "Web Data Extraction Based on Partial Tree Alignment", In Proceedings of the 14th International Conference on World Wide Web, May 10, 2005, pp. 76-85.

Zuyev, Konstantin, "Table Image Segmentation", In Proceedings of the 4th International Conference on Document Analysis and Recognition, Aug. 18, 1997, pp. 705-708.

"TableSense", Retrieved From: https://web.archive.org/web/20180617162926/https://github.com/haoyudongms/TableSense, Jun. 17, 2018, 1 Page.

ClosedXML, Retrieved From: https://web.archive.org/web/20181018095751/https://github.com/ClosedXML/ClosedXML, Oct. 18, 2018, 3 Pages.

* cited by examiner

700

| 0 | 0.1 | 0.1 | 0.08 | 0.1 | ... | | 710 |
|---|---|---|---|---|---|---|---|
| 0.05 | 0.85 | 0.85 | 0.85 | 0.85 | 720 ... | | |
| 0.07 | 1 | 1 | 1 | 1 | ... | | |
| 0.05 | 0.98 | 0.98 | 0.98 | 0.95 | ... | | |
| ... | ... | ... | ... | ... | ... | | |
| | | | | | ... | | |

FIG. 7

TABLE DETECTION IN SPREADSHEET

CROSS-REFERENCE TO RELATED APPLICATION

This application is a U.S. National Stage Filing under 35 U.S.C. 371 of International Patent Application Serial No. PCT/US2019/037414, filed Jun. 17, 2019, and published as WO 2020/005605 A1 on Jan. 2, 2020, which claims priority to Chinese Application No. 201810698750.9, filed Jun. 29, 2018, which applications and publication are incorporated herein by reference in their entirety.

BACKGROUND

With the emergence of various spreadsheet editing tools, spreadsheets become an important data storage format in people's daily life. Particularly, spreadsheets are already a major carrier of various data in daily workflow of industries such as banking, accounting and statistics. Spreadsheet editing tools provide users with flexible workspace, and users of the editing tools may add one or more tables to a spreadsheet as they wish.

However, when generating a spreadsheet, different users might have their own preferences, for example, some users might insert one table to a spreadsheet, while others might insert multiple tables to a spreadsheet and deploy the multiple tables in the spreadsheet in a way they desire. Each table may have a different size and location, and there may exist one or more empty cells in each table. At this point, how to detect a region occupied by each table in the spreadsheet is a focus of research. Further, since the subsequent processing of the spreadsheet relies heavily on the accurate detection of various tables in the spreadsheet, it is desirable to perform the detection processing with higher accuracy.

SUMMARY

In accordance with implementations of the subject matter described herein, provided is a solution for determining a table in a spreadsheet. In this solution, respective multiple attributes of multiple cells comprised in a spreadsheet may be extracted. Subsequently, respective features of the multiple cells may be determined based on the extracted multiple attributes. The multiple cells may be divided into at least one candidate region based on the features. At least one candidate table in the spreadsheet may be determined based on the at least one candidate region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 illustrates a block diagram for determining whether a potential error exists in a candidate region based on a probability whether each cell in a spreadsheet is within a table according to implementations of the present disclosure;

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Many companies have developed tools for editing spreadsheets. For example, with Excel® by Microsoft Company, users may add one or more tables to a spreadsheet. Since different users might have different preferences, some users might add multiple tables to a page and distribute the multiple tables at different locations in the spreadsheet according to their own preferences. At this point, how to detect the location of each table in the spreadsheet is a focus of research.

According to one technical solution, there are developed table detection solutions based on locations of empty cells and non-empty cells in a spreadsheet. Nevertheless, since the existence of empty cells in a spreadsheet is allowed in actual applications, especially there exist a large number of empty cells in a table when data are not filled in the table. Therefore, the accuracy of this technical solution in table detection is not high.

According to another technical solution, table detection by identifying a title, header and data portion of the table has been further proposed. However, a table designed by a user might have a complex structure, for example, the title may be omitted or the header might contain other structure such as a sub-header, this technical solution fails to accurately detect a table from a spreadsheet.

Therefore, it is desirable to provide a technical solution for detecting a table from a spreadsheet conveniently and effectively. Further, it is desired the technical solution may be compatible with existing spreadsheet editing tools and effect table detection more conveniently, quickly and accurately without changing data storage styles of existing spreadsheets as far as possible.

Example Environment

Figure 1:
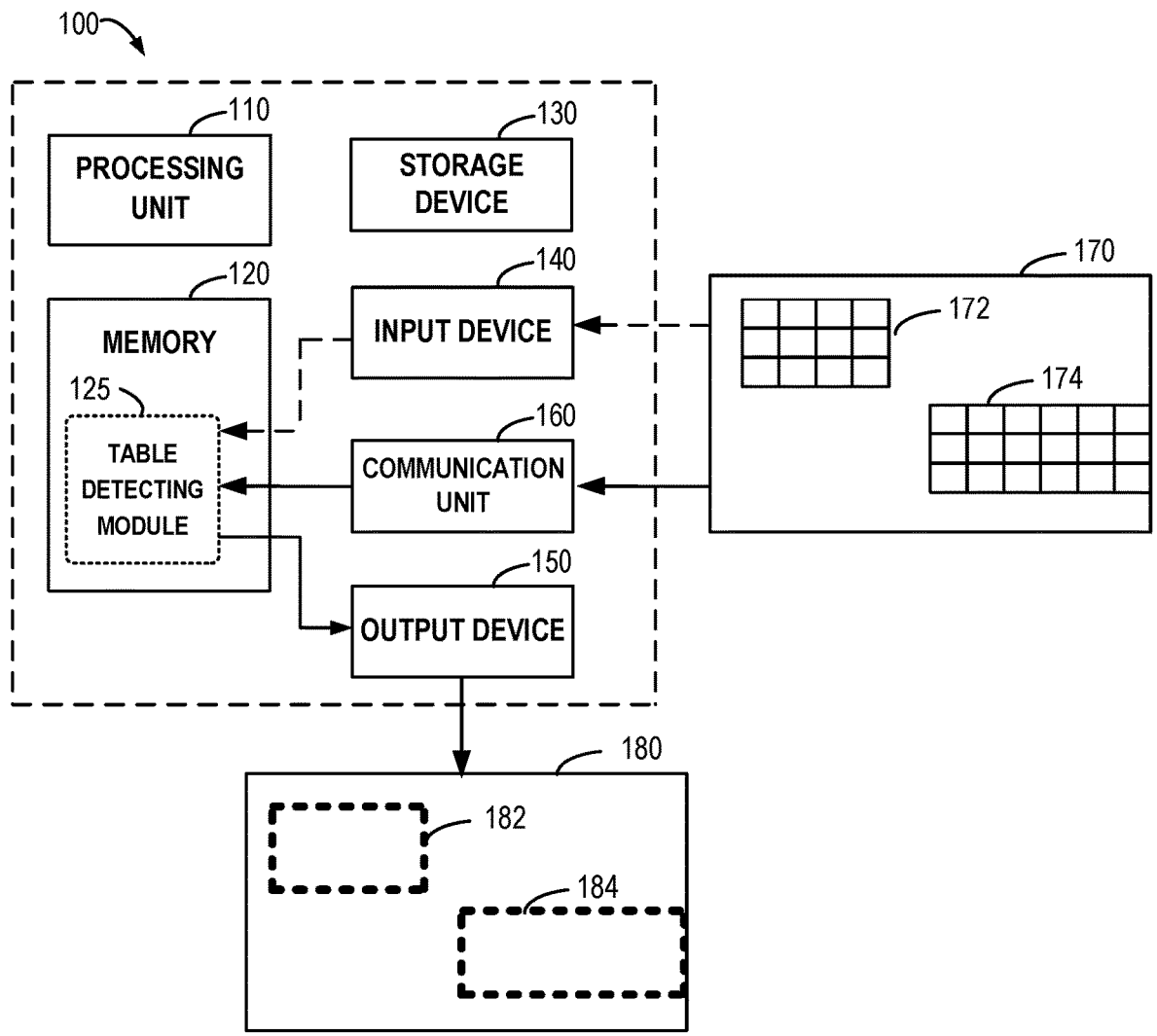
FIG. 1 illustrates a block diagram of a computing environment in which multiple implementations of the subject matter described herein can be implemented.

Basic principles and various example implementations of the subject matter described herein will now be described with reference to the drawings. FIG. 1 illustrates a block diagram of a computing environment 100 in which one or more implementations of the subject matter described herein can be implemented. It would be appreciated that the computing environment 100 described in FIG. 1 is merely for illustration and does not limit the function and scope of implementations of the subject matter described herein in any manners.

As shown in FIG. 1, the computing device 100 includes a computing device 100 in form of a general computer device. Components of the computing device 100 include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminals may be large-scale computing device and servers provided by various service providers, etc. The user terminals may be, for example, any type of mobile terminals, stationary terminals or portable terminals, including mobile phones, stations, cells, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/video cameras, positioning devices, TV receives, radio broadcast receivers, ebook devices, game devices or any combinations thereof, including accessories and peripherals of these devices or any combinations of. It may be further anticipated the computing device 100 can support any type of interfaces (such as "wearable" circuits, etc.) to users.

The processing unit 110 can be a physical or virtual processor and can execute various processes based on the programs stored in the memory 120. In a multi-processor system, multiple processing units execute computer-executable instructions in parallel to improve the parallel processing capacity of the computing device 100. The processing unit 110 may also be referred to as a central processing unit (CPU), microprocessor, controller, or microcontroller.

The computing device 100 typically includes a plurality of computer storage media, which can be any available media accessible by the computing device 100, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof.

The memory 120 may comprise an information providing module 125, which is configured to perform functions of various implementations described herein. Note in the subject matter described herein, the terms "information providing method" and "information providing module" are used interchangeably. The information providing module 125 may be accessed and run by the processing unit 110 so as to accomplish a corresponding function.

The storage device 130 can be any removable or non-removable media and may include machine-readable media, such as a memory, flash drive, disk, and any other media, which can be used for storing information and/or data and accessed in the computing device 100.

The input device 140 may include one or more input devices, such as a mouse, keyboard, tracking ball, voice-input device, and the like. The output device 150 may include one or more output devices, such as a display, loudspeaker, printer, and the like.

The communication unit 160 communicates with a further computing device via communication media. Additionally, functions of components in the computing device 100 can be implemented by a single computing cluster or multiple computing machines connected communicatively for communication. Therefore, the computing device 100 can be operated in a networking environment using a logical link with one or more other servers, network personal computers (PCs) or another general network node. As required, the computing device 100 can also communicate via the communication unit 160 with one or more external devices (not shown) such as a storage device, display device and the like, one or more devices that enable users to interact with the computing device 100, or any devices that enable the computing device 100 to communicate with one or more other computing devices (for example, a network card, modem, and the like). Such communication is performed via an input/output (I/O) interface (not shown).

The computing device 100 may receive a to-be-processed spreadsheet 170 by means of the communication unit 160, which spreadsheet 170 may comprise one or more tables 172 and 174. Alternatively, the computing device 100 may also receive the spreadsheet 170 via the input device 140. The spreadsheet 170 is passed to a table detection module 125 for processing. According to implementations of the subject matter described herein, the table detection module 125 determines from the spreadsheet 170 one or more candidate regions 182 and 184 where a table might exists. As shown by a processed spreadsheet 180 in FIG. 1, a table may be detected from the determined candidate regions 182 and 184.

It will be understood that the communication between the table detection module 125 and the input device 140, the output device 150 may be effected by means of an interface provided by an operating system (OS) on the computing device 100. Examples of such an interface include, but not limited to, various application programming interfaces (APIs).

Working Principles

Figure 2:
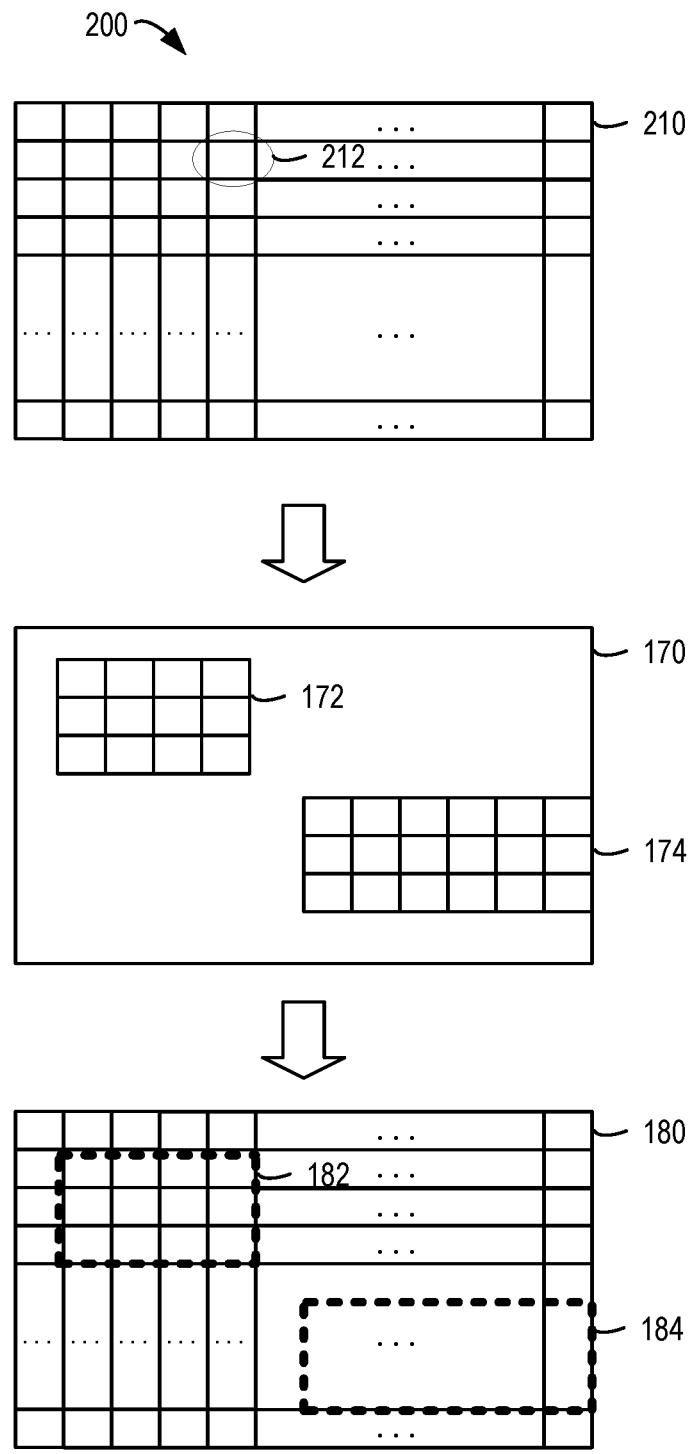
FIG. 2 illustrates a general block diagram of a solution for detecting a table in a spreadsheet according to implementations of the subject matter described herein.

Working principles of the solution of the subject matter described herein will be described in detail with reference to the accompanying drawings. According to implementations of the subject matter described herein, there is provided a solution for table detection in a spreadsheet. Description is presented below with reference to FIG. 2, which figure schematically shows a summary block diagram of a solution for table detection in a spreadsheet according to implementations of the subject matter described herein. As depicted, a blank spreadsheet 210 may comprise multiple cells, among which a cell 212 schematically shows one of cells on the blank spreadsheet 210. Although various cells have the same size as shown in FIG. 2, according to example implementations of the subject matter described herein, these cells may further have different sizes. It will be understood the user may add one or more tables to the blank spreadsheet 210.

For example, the user may edit various cells in the blank spreadsheet 210 and add multiple tables to the blank spreadsheet 210 to form the spreadsheet 170. For clarity purposes, no empty cells in the spreadsheet 170 are shown, but cells comprised in two tables 172 and 174 are schematically shown. It will be understood that the user may add tables by editing various cells in the spreadsheet 170. For example, the user may add to cells data contents such as characters, numerals and so on, and further the user may modify the background color and size of a cell. At this point, the spreadsheet 170 is a spreadsheet which will be processed so as to detect tables thereon.

As shown in FIG. 2, multiple attributes may be extracted from a given cell among multiple cells comprised in the spreadsheet 170. The attributes here may comprise any of: characters of data in the given cell, format of data in the given cell, and style of the given cell. Subsequently, a corresponding feature of the given cell among the multiple cells may be determined based on the extracted multiple attributes. For example, the extracted feature of each cell may be stored in form of a vector. As shown in FIG. 2, feature vectors of all cells may be combined so as to form a feature vector matrix shown in the processed spreadsheet 180.

Based on respective features of cells among the multiple cells, the multiple cells may be divided into one or more candidate regions (e.g. 182 and 184). In this implementation, one or more candidate regions 182 and 184 may be obtained by clustering feature vectors of the multiple cells. At this point, feature vectors of cells in the resultant candidate regions 182 and 184 have a high correlation, so one or more candidate tables in the spreadsheet may be determined based on the one or more candidate regions 182 and 184.

It will be understood that multiple cells in a table may be similar to a certain extent. For example, generally data in multiple cells in a table may have the same font, character size, background color and other attributes. With the above example implementations, one or more candidate regions of a possible table may be determined easily and effectively by extracting features of various cells and clustering the obtained features. Further, a table may be determined based on the determined one or more candidate regions.

Example Process

Figure 3:
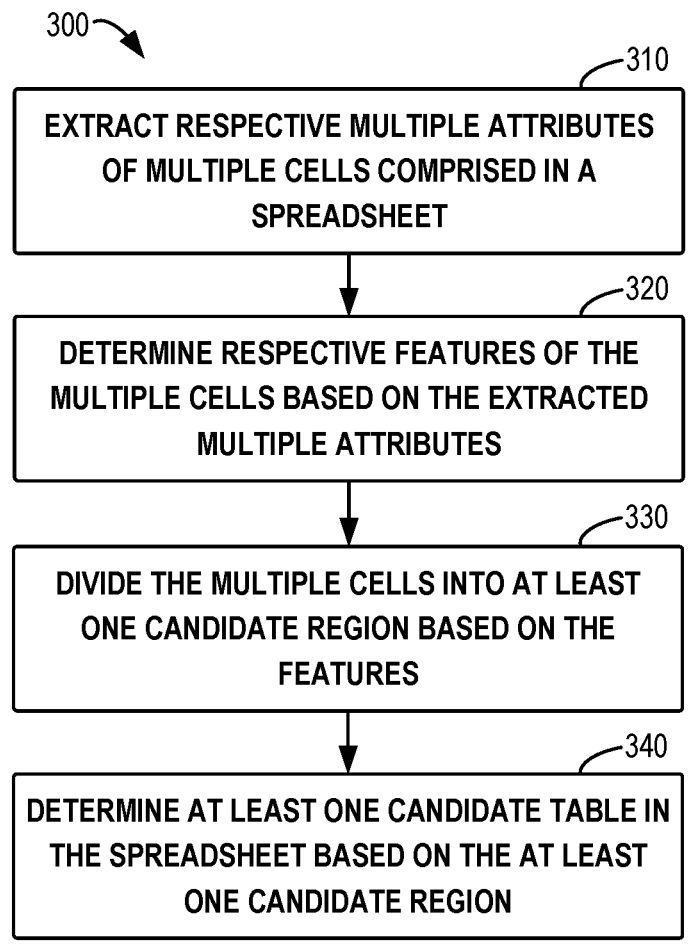
FIG. 3 illustrates a flowchart of a method for detecting a table in a spreadsheet according to implementations of the subject matter described herein.

With reference to FIG. 3, a detailed description is presented below to the detailed operation flow of a method of the subject matter described herein. FIG. 3 schematically shows a flowchart of a method 300 for detecting a table in a spreadsheet 170. At block 310, respective multiple attributes of multiple cells comprised in the spreadsheet 170 may be extracted. According to example implementations of the present disclosure, the spreadsheet 170 may have a predefined size (e.g. predefined length and width), at which point attributes may be extracted from multiple cells with a range of the predefined size. According to example implementations of the present disclosure, the spreadsheet 170 may further have a variable size, at which point a region where non-empty cells in the spreadsheet reside may be used as the size of the spreadsheet.

It will be understood that the spreadsheet 170 in the context of the subject matter described herein may comprise one or more pages (e.g. one or more sheets in an Excel file). In order to simplify the description, concrete implementation of recognizing a table on only one page of the spreadsheet 170 will be described, and operations to other pages of the spreadsheet 170 are performed similarly. In this implementation, attributes of a cell may comprise various aspects, such as characters of data in the cell, format of data in the cell, and style of the cell. Attributes may be extracted from at least any of these aspects.

At block 320, respective features of the multiple cells may be determined based on the extracted multiple attributes. A feature corresponding to each cell may be stored in form of a vector. At this point, each extracted attribute may act as a dimension in the feature vector. According to example implementations of the present disclosure, suppose 10 attributes have been extracted, then at this point the feature vector has 10 dimensions. For another example, when a further number of attributes have been extracted, then the dimensionality of the feature vector may be set to other value.

At block 330, the multiple cells may be divided into at least one candidate region 182 and 184 based on the features. In general, multiple cells in a table will be similar to a certain extent, for example, the user usually sets various cells in one table to the same background color and sets cells in another table to another background color. Where the extracted attributes comprise a background color of the cell and an indication whether a character string within the cell is empty, different candidate regions comprising cells with different background colors in the spreadsheet 170 may be obtained through clustering various cells by "background color." It will be understood although this operation only shows a simple example of clustering various cells by "background color," according to example implementations of the subject matter described herein, the feature vector may comprise more dimensions, and the multiple cells may further be divided into multiple candidate regions 182 and 184 according to a more complex rule.

At block 340, at least one candidate table in the spreadsheet 170 may be determined based on the at least one candidate region 182 and 184. Where it is determined that the one or more candidate regions 182 and 184 are comprised in the spreadsheet 170, one candidate table may be determined from each candidate region. While a general description has been presented above to the steps of the method according to example implementations of the subject matter described herein, more details of each step will be described below.

Extract Attributes of Cells

According to example implementations of the subject matter described herein, attributes may comprise multiple aspects of contents, and multiple attributes of a corresponding cell may be extracted based on at least any of: characters of data in the corresponding cell, format of data in the corresponding cell, and style of the corresponding cell. With the above example implementations, multiple aspects of features of the cell in the spreadsheet may be extracted. In this way, the accuracy of table detection in the spreadsheet 170 can be improved.

According to example implementations of the subject matter described herein, attributes of the cell may be extracted based on characters of data in the cell. As shown in Table 1 below, the first column represents the serial number of an attribute associated with a character string, the second column represents concrete description of the attribute, and the third column represents the data type of the attribute. Take a record in the $1^{st}$ row in Table 1 as an example, the record relates to the first attribute, and the attribute represents if a character string of data in the cell is empty. In the example of Table 1, if the character string in the cell is empty (i.e. includes no content), then at this point the corresponding attribute may be set to "0;" if the character string in the cell is non-empty (i.e. includes characters), then at this point the corresponding attribute may be set to "1." Similarly, the $2^{nd}$ row in Table 1 represents the length of the character string in the cell, and the length of the character string may be denoted in the integer type. In the $3^{rd}$ to $4^{th}$ rows in Table 1, the proportion of digits/letters in the character string may be denoted by a value in a range [0, 1]. In the $5^{th}$ to $6^{th}$ rows in Table 1, whether "%" and "." exist in the character string may be denoted in the Boolean type.

TABLE 1

Character String-Related Attributes

| No. | Description | Value Type |
|---|---|---|
| 1 | Whether the character string is empty | Boolean type |
| 2 | Length of the character string | Integer type |
| 3 | Proportion of digits in the character string | [0, 1] |
| 4 | Proportion of letters in the character string | [0, 1] |
| 5 | Whether percent symbol "%" exists in the character string | Boolean type |
| 6 | Whether decimal point "." exists in the character string | Boolean type |

It will be understood that Table 1 merely illustrates an example of the attributes, according to example implementations of the present disclosure, character-related attributes may comprise more, less or different contents.

Table 2 below schematically shows an example of attributes associated with the data format in the cell. As depicted, the first column in Table 2 represents the serial number of an attribute associated with the data format, the second column represents concrete description of the attribute, and the third column represents the data type of the attribute. Take a record in the $1^{st}$ row in Table 2 as an example. The record is the first attribute, and the attribute represents whether the data format in the cell matches a predefined template.

Here, the template may be provided in various types, for example, the template of a decimal type may be represented as "*.*," the template of a percent type may be represented as "*%," etc. If the data format in the cell belongs to a certain type of templates, then at this point the corresponding attribute may be set to "1"; otherwise, the corresponding attribute may be set to "0." Likewise, the 2nd and 3rd rows in Table 2 represent whether the data format in the cell matches a date template and a time template, respectively, the $4^{th}$ row represents the length of a template which data in the cell match, and the $5^{th}$ row identifies whether a formula exists among data in the cell.

TABLE 2

Data Format Related Attributes

| No. | Description | Value Type |
|---|---|---|
| 1 | Whether data format matches a numerical template, e.g. "*.*," "*%" and "*.*E+*" | Boolean type |
| 2 | Whether data format matches a date template, e.g. "dd/mm/yyyy" and "mm/yy" | Boolean type |

TABLE 2-continued

Data Format Related Attributes

| No. | Description | Value Type |
|---|---|---|
| 3 | Whether data format matches a time template, e.g. "hh/mm/ss" and "hh:mm:ss" | Boolean type |
| 4 | Length of the matched template | Integer type |
| 5 | Whether formula exists | Boolean type |

It will be understood that Table 2 merely illustrates an example of the attributes, according to example implementations of the present disclosure, data format-related attributes may comprise more, less or different contents.

Table 3 below schematically shows an example of attributes associated with the style in the cell. As depicted, the first column in Table 3 represents the serial number of an attribute associated with the style, the second column represents concrete description of the attribute, and the third column represents the data type of the attribute. Take a record in the 1st row in Table 3 as an example. The record relates to the first attribute, and the attribute represents a background color of the cell. In this implementation, a color value may be quantified as a level between 0 and 100, wherein 0 represents pure white and 100 represents pure black. At this point, 4 may denote white. In another implementation, the color value may be represented in RGB format, for example, pure white background may be represented as (255, 255, 255). Based on the description in the second column of Table 3, those skilled in the art may understand concrete meaning of each attribute, which is not detailed herein.

TABLE 3

Style Related Attributes

| No. | Description | Value Type |
|---|---|---|
| 1 | Background color of the cell, e.g. white | Color value |
| 2 | Color of a character string in the cell, e.g. black | Color value |
| 3 | Whether bold font is applied to the character string | Boolean type |
| 4 | Whether italics font is applied to the character string | Boolean type |
| 5 | Whether underlined font is applied to the character string | Boolean type |
| 6 | Whether blank exists on left border | Boolean type |
| 7 | Whether blank exists on right border | Boolean type |
| 8 | Whether blank exists on upper border | Boolean type |
| 9 | Whether blank exists on lower border | Boolean type |
| 10 | Whether the cell is merged with horizontal neighbor | Boolean type |
| 11 | Whether the cell is merged with vertical neighbor | Boolean type |

Determine Features of Cell

Concrete examples of how to extract attributes of given cell have been described with reference to Table 1 to Table 3. Hereinafter, a detailed description is presented to how to determine features of a cell based on extracted attributes.

Attributes associated with a character string in a cell may be determined based on the description in Table 1. For example, suppose a character string "hello" exists in a given cell, then attributes associated with the character string in the cell may be represented as vector 1: (1, 5, 0, 1, 0, 0). The attributes indicate the character string in the given cell is non-empty, the length of the character string is 5, the character string does not include any digit, all characters of the character string are letters, and the character string does not include a percent symbol or a decimal point.

Attributes associated with the data format of a cell may be determined based on the description in Table 2. For example, continuing the above character string "hello" as an example, attributes associated with the data format of the cell may be represented as vector 2: (0, 0, 0, 0, 0). The attributes indicate data comprised in the given cell do not match any type of template, the length of a matched template is 0, and there exists no formula.

Attributes associated with the style of a cell may be determined based on the description in Table 3. Suppose the background color of the character string "hello" is white, the color of the character string is black, the character string is in normal font, there is no blank on any border, and the cell is not merged with other cell. At this point, the attributes associated with the style of the cell may be represented as vector 3: (4, 96, 0, 0, 0, 0, 0, 0, 0, 0).

According to example implementations of the present disclosure, the vectors 1 to 3 may be combined to obtain a feature vector of the cell. For example, the vectors 1 to 3 may be connected, and for another example, a weight may be assigned to each dimension in the vector. For the sake of brief description, a feature vector of the cell may be determined based on only three attributes: whether the character string is empty, whether the data format matches a numerical template, a background color of the cell. At this point, the feature vector of the given cell may be presented as (1, 0, 4). It will be understood although described above is an example for determining the feature vector based on the attributes in Table 1 to Table 3, according to example implementations of the present disclosure, the feature vector may further be determined based on other attributes that are not included in Table 1 to Table 3.

Determine Candidate Region

According to example implementations of the present disclosure, one or more candidate regions 182 and 184 may be determined in various ways. For example, first a mapping relationship between a table in a spreadsheet and features of multiple cells in the table may be obtained. It will be understood that the mapping relationship here may be defined based on a historical empirical value. For example, the historical experience shows that cells in a table may have the same background color, and then at this point a mapping relationship between the cells having the same background color and the table may be established. According to this mapping relationship, the cells having the same background color may be dispatched to the same candidate region. For another example, a mapping relationship between cells having the same font color and a table may be established, and then at this point the cells having the same font color may be dispatched to the same candidate region. Still for another example, a mapping relationship may be established based on a merging relationship between cells. Suppose one cell is merged with another cell, then the two merged cells may be dispatched to the same candidate region.

Figure 4:
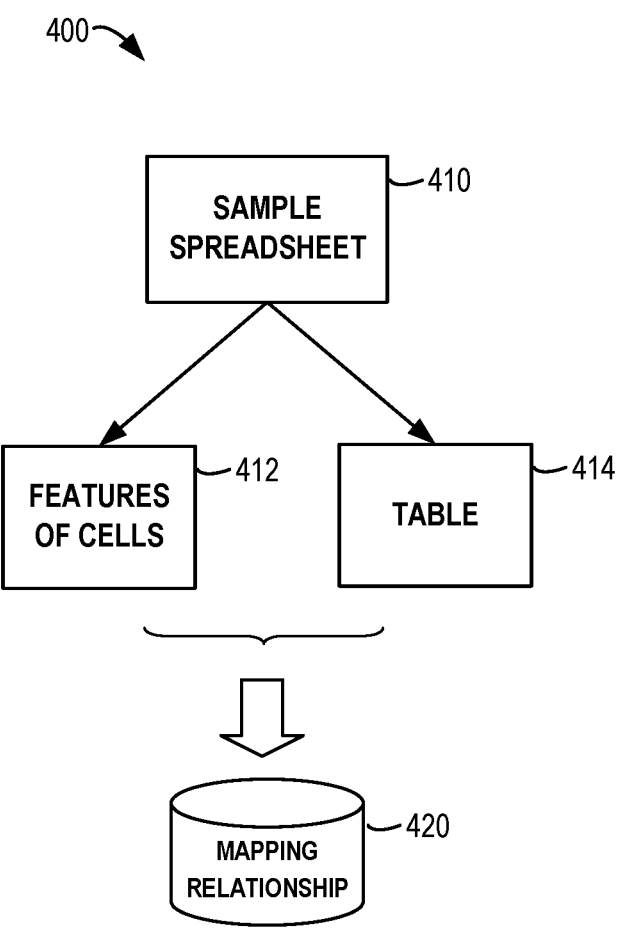
FIG. 4 illustrates a block diagram of a solution for obtaining a mapping relationship according to implementations of the subject matter described herein.

According to example implementations of the present disclosure, the mapping relationship may be trained based on features of multiple cells in a set of sample spreadsheets and multiple tables in the set of sample spreadsheets. With reference to FIG. 4, description is presented below to how to obtain the mapping relationship. FIG. 4 schematically shows a block diagram 400 of a solution for obtaining a mapping relationship 420 according to implementations of the present disclosure. As depicted, a set of sample spreadsheets 410 may be selected in advance, and features 412 of respective cells in the set of sample spreadsheets 410 may be determined. Further one or more tables 414 in the set of sample spreadsheets 410 may be marked. It will be understood that the table 414 here refers to a table actually existing in the set of sample spreadsheets 410. For example, the table 414 in the sample spreadsheet 410 may be manually identified. Alternatively or additionally, a table recognized by a machine may be corrected manually so as to obtain the table 414. Subsequently, the set of sample spreadsheets 410 and the identified table 414 may be used as input data to train the mapping relationship 420.

It will be understood that the concrete type of the mapping relationship 420 is not to be limited in the context of the present disclosure, but the mapping relationship 420 may be defined using various knowledge learning techniques that are currently known or will be developed in future. According to example implementations of the present disclosure, the mapping relationship 420 may be obtained based on a neural network model. With the example implementations, the obtained mapping relationship 420 may comprise information on the table 414 actually existing in the set of sample spreadsheets 410, and the information may be used to predict a candidate region that might include a candidate table in other spreadsheet. In this way, the candidate region in the spreadsheet may be determined more accurately based on the historical experience.

According to example implementations of the present disclosure, the mapping relationship 420 may be comprised in a knowledge model. Further, the knowledge model may comprise knowledge in other aspects. For example, the knowledge model may further comprise: probabilistic information describing the probability that a table exists in a candidate region among one or more candidate regions obtained according to a mapping relationship among the mapping relationships 420, and mask information describing whether a cell in the spreadsheet 170 resides in a table. The following paragraphs will describe how to update more information of the mapping relationship based on the above knowledge.

Where the mapping relationships 420 have been obtained, one or more candidate regions may be determined based on a mapping relationship among the mapping relationships 420 and a feature of a corresponding cell among multiple cells. In this implementation, features of multiple cells in the to-be-processed spreadsheet 170 may be used as an input, and the multiple cells in the spreadsheet 170 may be divided into one or more candidate regions based on input features of the multiple cells by applying the mapping relationship 420. It will be understood that the region here refers to a region where cells in each group reside after the multiple cells are divided into different groups. Generally, the candidate region may be a bounding box for cells in each group.

According to example implementations of the present disclosure, for a given candidate region of the one or more candidate regions, a boundary of the given candidate region may be adjusted based on the mapping relationship 420 so as to update the given candidate region. A candidate region 510 may comprise upper, lower, left and right boundaries. In these implementations, any one of the above four boundaries may be adjusted separately, so as to define the candidate region 510 more accurately.

Figure 5:
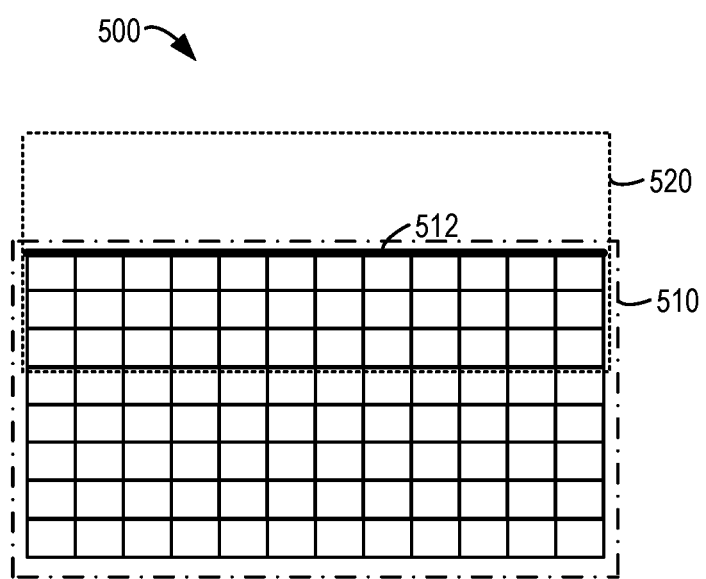
FIG. 5 illustrates a block diagram for adjusting a location of a boundary of a given candidate region according to implementations of the subject matter described herein.

According to example implementations of the present disclosure, where a candidate region has been determined, each boundary of the candidate region may be adjusted. With reference to FIG. 5, how to adjust the upper boundary of the candidate region will be described below. FIG. 5 schematically shows a block diagram 500 for adjusting a location of a boundary of the given candidate region 510 according to example implementations of the present disclosure. As depicted, suppose the candidate region 510 (a box as shown by dot-and-dash lines), and 4 boundaries of the candidate region 510 define a region where a table might exist, so it is desirable to determine the scope of the boundaries of the candidate region 510 as accurately as possible. At this point, any boundary of the candidate region 510 may be adjusted. Description is presented only by taking an upper boundary 512 in FIG. 5 as an example.

As shown in FIG. 5, adjustment scope 520 (a block as shown by dotted lines) may be set around the upper boundary 512, the adjustment scope 520 having the same width as the candidate region 510 and having a height that may be set to a predefined value. According to example implementations of the present disclosure, the predefined value may be set to a fixed value, e.g. 8 or other value. According to example implementations of the present disclosure, the predefined value may further be set to ¼ of the height of the candidate region 510 or set according to other proportion.

In this implementation, the height of the adjustment scope 520 may be set as high as 6 cells. The upper boundary 512 may be set within the adjustment scope 520, for example, the upper boundary 512 may be adjusted downwards by 1 to 3 rows or upwards by 1 to 3 rows, so as to obtain adjusted scope. Subsequently, a matching degree of the adjusted region with the mapping relationship 420 may be determined. If the adjusted region better matches the mapping relationship 420, the upper boundary 512 of the candidate region may be updated based on the adjusted region.

It will be understood how to adjust the upper boundary of the candidate region 510 has been described for the illustration purpose only. According to example implementations of the present disclosure, lower, left and right boundaries of the candidate region 510 may further be adjusted similarly. With the above example implementation, the scope of the candidate region 510 may be adjusted more precisely.

Update Mapping Relationship

How to determine a candidate region based on the mapping relationship 420 has been described in detail above. The following situation might further exist: the mapping relationship 420 might contain some inaccurate factors, which cause a potential error in a candidate region divided based on the obtained mapping relationship 420. Therefore, when a potential error is found, the mapping relationship 420 needs to be further updated. According to example implementations of the present disclosure, if a potential error in the given candidate region of the one or more candidate regions is determined, then one or more actual tables may be obtained in the spreadsheet, and the mapping relationship 420 may be updated based on the one or more real tables and features of the multiple cells in the spreadsheet.

Figure 6:
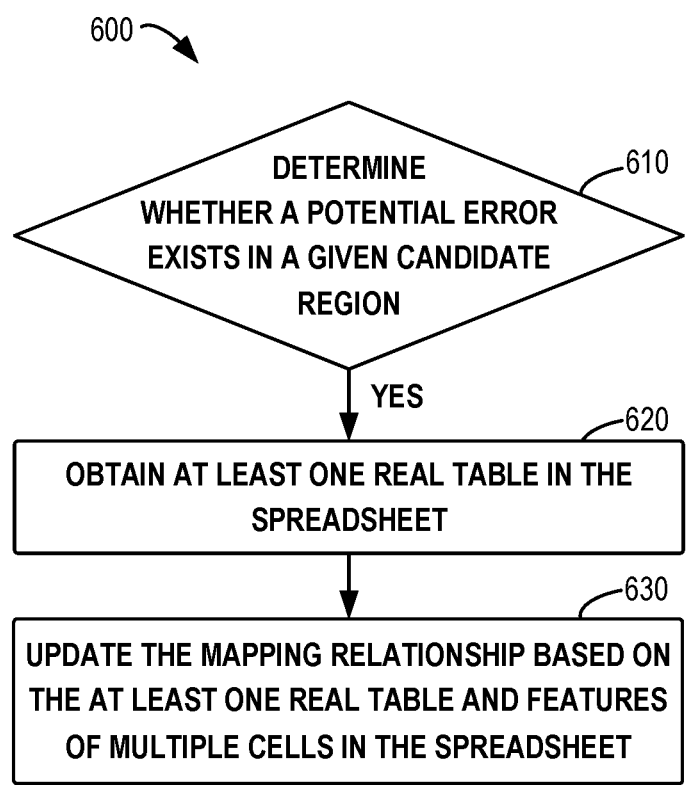
FIG. 6 illustrates a block diagram of a method for updating a mapping relationship based on an error detected in a candidate region according to implementations of the subject matter described herein.

Specifically, FIG. 6 schematically shows a block diagram of a method 600 for updating the mapping relationship 420 based on an error detected in a candidate region according to example implementations of the present disclosure. As depicted, first it may be determined at block 610 whether a potential error exists in a given candidate region. The potential error here refers to nonconformity between a state of the given candidate region and a historical empirical value. For example, suppose an empty row or an empty column exists at a boundary location of the given candidate region, then it may be determined a potential error exists in the given candidate region. For another example, suppose the given candidate region comprises a large number of empty cells, then it may be determined a potential error exists in the candidate region. According to example implementations of the present disclosure, there may be other rules for determining whether there is a potential error, which will be described with reference to FIGS. 7 to 10.

When a potential error is found in the given candidate region, then the operation flow proceeds to block 620 to obtain one or more real tables in the spreadsheet 170. In this procedure, the spreadsheet 170 where the current candidate region resides may be submitted for manual processing, the spreadsheet 170 may be precisely analyzed in a manual way, and one or more real tables in the spreadsheet 170 may be marked. Subsequently, at block 630 the mapping relationship 420 may be updated based on the marked one or more real tables and features of the multiple cells in the spreadsheet.

It will be understood that tables used as a training input at this point are real tables precisely identified in a manual way and can reflect the real situation of tables in the spreadsheet. By updating the mapping relationship 420 using such real tables identified manually, an error in the mapping relationship 420 can be corrected, especially an error leading to a potential error in the given candidate region.

Detect Potential Error in Candidate Region

In the context of the present disclosure, a potential error in a candidate region may be determined based on various factors. According to example implementations of the present disclosure, whether a potential error exists may be determined based on probabilistic information contained in the knowledge model. In the implementations, the probabilistic information describes the probability that a table exists in a candidate region of the one or more candidate regions obtained according to a mapping relationship among the mapping relationships 420. Further, the probability that a table exists in the given candidate region determined according to the above method may be determined based on the probabilistic information. If the probability is below a predefined threshold probability, then it is determined a potential error exists in the given candidate region.

In the implementations, the probabilistic information is obtained based on the training of sample spreadsheets, and the probabilistic information can predict the probability that a table exists in the candidate region in the to-be-processed spreadsheet 170, based on experience associated with the sample spreadsheets. If the probability associated with the given candidate region 182 resulting from division is below a predefined threshold, then at this point it may be considered the probabilistic information needs to be updated based on the spreadsheet 210. With the above example implementations, an error in the mapping relationship 420 can be corrected effectively.

Specifically, the probabilistic information may comprise a table score that is set for the resulting given candidate region 182, and the table score indicates the probability that a real table exists in the given candidate region 182. The probabilistic information may be trained based on a manually identified table in the sample spreadsheet. According to example implementations of the present disclosure, the size of the probability may be represented by a value between 0 and 1. Suppose the probability for a given candidate region is 0.1, this indicates the candidate region probably does not include any table. If the probability for a given candidate region is 0.95, this indicates the candidate region probably includes a table.

When features of multiple cells in the spreadsheet 170 are used as an input, the probability that a table exists in the resulting candidate region 182 may be determined based on the probabilistic information. For example, suppose the determined probability is 0.85, and the probability is below the predefined probability threshold 0.9, then at this point it may be considered a potential error exists in the given candidate region 182. A real table in the given spreadsheet 170 may be identified manually, and the mapping relationship 420 may be updated based on the real table and features of multiple cells in the given spreadsheet 170.

According to example implementations of the present disclosure, template information contained in the knowledge model may further be obtained, the template information describing whether a cell in the spreadsheet 170 is resided within the table. FIG. 7 schematically shows a block diagram 700 for determining whether an error exists in a candidate region 720 based on the probability whether each cell in a spreadsheet 710 is within the table. As depicted, for each cell in the given spreadsheet 710, the probability whether each cell is within or out of the table may be indicated. According to example implementations of the present disclosure, the template information may be represented using an M×N matrix, wherein M denotes the width of the spreadsheet 710, N denotes the height of the spreadsheet 710, and each element in the matrix may be denoted by a value between 0 and 1. For example, 0 may indicate a cell is out of the table, and 1 may indicate a cell is within the table.

In the implementations, the probability that a cell in the given region is within the table may be determined based on the template information. If the probability is below a predefined threshold probability, then it is determined a potential error exists in the given candidate region. As shown in FIG. 7, for the candidate region 720, probability values of all cells in the candidate region 720 may be averaged so as to determine whether a potential error exists in the candidate region 720. At this point, for the candidate region 720, an average value=(0.85+0.85+ . . . +0.95)/12=0.941, and the average value is below the predefined threshold probability 0.95. Hence, it may be considered an error exists in the candidate region 720. In this way, it may be judged more accurately whether a potential error exists in the candidate region 720.

According to example implementations of the present disclosure, if the given candidate region overlaps with a further candidate region of the one or more candidate regions, then it is determined a potential error exists in the given candidate region. It will be understood conventional experience indicates there is no overlap between two tables in the spreadsheet. If two resulting candidate regions in the spreadsheet overlap, there is reason to believe an error might exist in the mapping relationship 420 on which basis the spreadsheet is processed.

With the above example implementations, by identifying a real table in the spreadsheet 710 that causes the average value to be lower than the predefined threshold probability and by updating the mapping relationship 420 with the identified real table and features of multiple cells in the spreadsheet 710, the error can be corrected effectively in the mapping relationship 420 which causes the average value to be lower than the predefined threshold probability.

Figure 8:
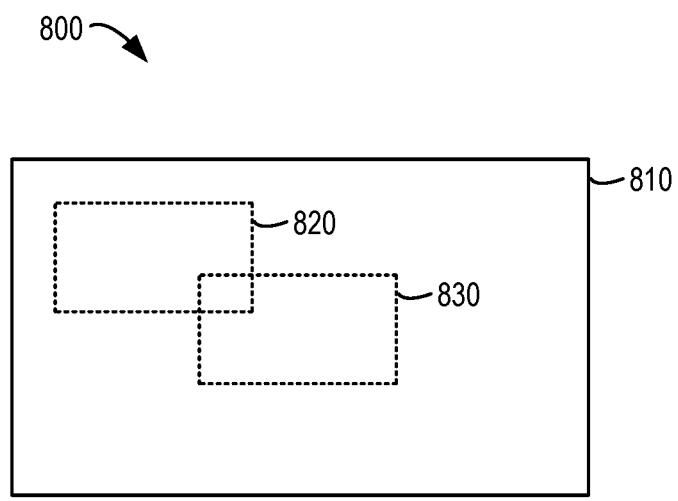
FIG. 8 illustrates a block diagram for determining whether an error exists in a given candidate region depending on whether the given candidate region overlaps with a further candidate region according to implementations of the present disclosure.

FIG. 8 schematically shows a block diagram 800 for determining whether an error exists in a candidate region depending on whether the candidate region overlaps with a further candidate region according to example implementations of the present disclosure. As depicted, a spreadsheet 810 may be processed using the above described method, and candidate regions 820 and 830 may be obtained. As shown in FIG. 8, the two candidate regions 820 and 830 contain an overlap, so at this point it may be considered an error exists in the mapping relationship 420, on which basis the spreadsheet 810 is processed, and needs to be corrected.

With the above example implementations, by identifying a real table in the spreadsheet 810 that causes an overlap between candidate regions and by updating the mapping relationship 420 with the identified real table and features of multiple cells in the spreadsheet 810, the error can be corrected effectively in the mapping relationship 420 which causes the average value to be lower than the predefined threshold probability.

According to example implementations of the present disclosure, if an edge portion of the given candidate region comprises at least one of an empty row and an empty column, then it is determined a potential error exists in the given candidate region. It will be understood conventional experience indicates that usually no empty row or empty column exists in the edge portion. If an empty row/column exists in the edge portion of the resulting candidate region, there is reason to believe an error might exist in the mapping relationship 420 on which basis the spreadsheet is processed.

Figure 9:
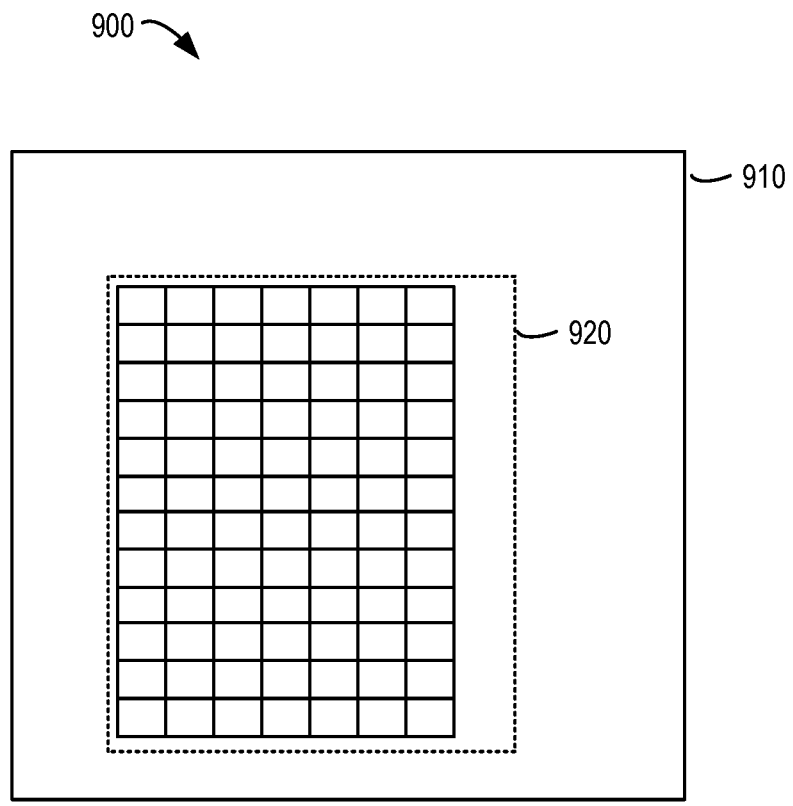
FIG. 9 illustrates a block diagram for determining whether an error exists in a candidate region depending on whether the candidate region comprises an empty column/row according to implementations of the present disclosure.

FIG. 9 schematically shows a block diagram 900 for determining whether an error exists in a candidate region 920 depending on whether an edge portion of the candidate region 920 comprises an empty column/row according to example implementations of the present disclosure. As depicted, a spreadsheet 910 may be processed using the above described method, and a candidate region 920 may be obtained. As shown in FIG. 9, there is an empty column on the right of the candidate region 920, so at this point it may be considered an error exists in the mapping relationship 420, on which basis the spreadsheet 910 is processed, and needs to be corrected.

With the above example implementations, by identifying a real table in the spreadsheet 910 associated with an empty row/column and by updating the mapping relationship 420 with the identified real table and features of multiple cells in the spreadsheet 910, the error can be corrected effectively in the mapping relationship 420 which causes an empty row/column to exist in the edge portion of the candidate region.

According to example implementations of the present disclosure, whether a potential error exists in a given candidate region of the one or more candidate regions may be further determined based on a location relationship between a non-empty/empty cell among multiple cells and the given candidate region. In the implementations, discussions may be provided based on a non-empty cell within a candidate region and a non-empty cell out of the candidate region respectively.

According to example implementations of the present disclosure, if the proportion of non-empty cells within the given candidate region is below a predefined threshold, then it may be determined a potential error exists. In other words, if the proportion of the number of empty cells within the given candidate region to the number of cells within the given candidate region is higher than a predefined threshold proportion, then it is determined a potential error exists in the given candidate region.

Figure 10A:
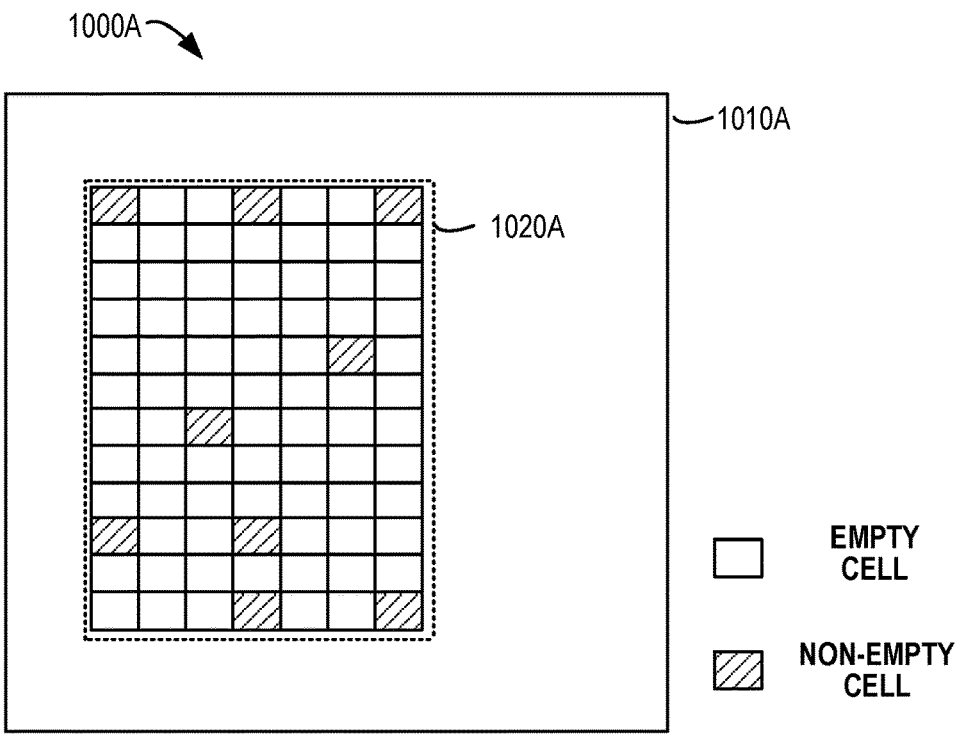
FIG. 10A illustrates a block diagram for determining whether an error exists in a candidate region based on an empty cell comprised in the candidate region according to implementations of the present disclosure.

FIG. 10A schematically shows a block diagram 1000A for determining whether an error exists in a candidate region 1020A based on empty cells comprised in the candidate region 1020 according to example implementations of the present disclosure. As depicted, blank legends represent empty cells, and shaded legends represent non-empty cells. A spreadsheet 1010A may be processed using the above described method, and the candidate region 1020A may be obtained. As shown in FIG. 10A, the candidate region 1020 comprises a large number of empty cells. In general, a table probably comprises only a few empty cells, e.g. a predefined ratio (e.g. 20% or other value) less than the total number of cells. If the proportion of the number of empty cells in the candidate region 1020A to the total number of cells is higher than a predefined threshold, then it may be considered an error exists in the mapping relationship 420, on which basis the spreadsheet 1010A is processed, and needs to be corrected.

With the above example implementations, by identifying a real table in the spreadsheet 1010A and by updating the mapping relationship 420 with the identified real table and features of multiple cells in the spreadsheet 1010A, the error can be corrected effectively in the mapping relationship 420 which causes a larger number of empty cells to appear in the candidate region.

According to example implementations of the present disclosure, if the number of non-empty cells out of the one or more candidate regions amount to a predefined threshold, then it is determined a potential error exists in the given candidate region.

Figure 10B:
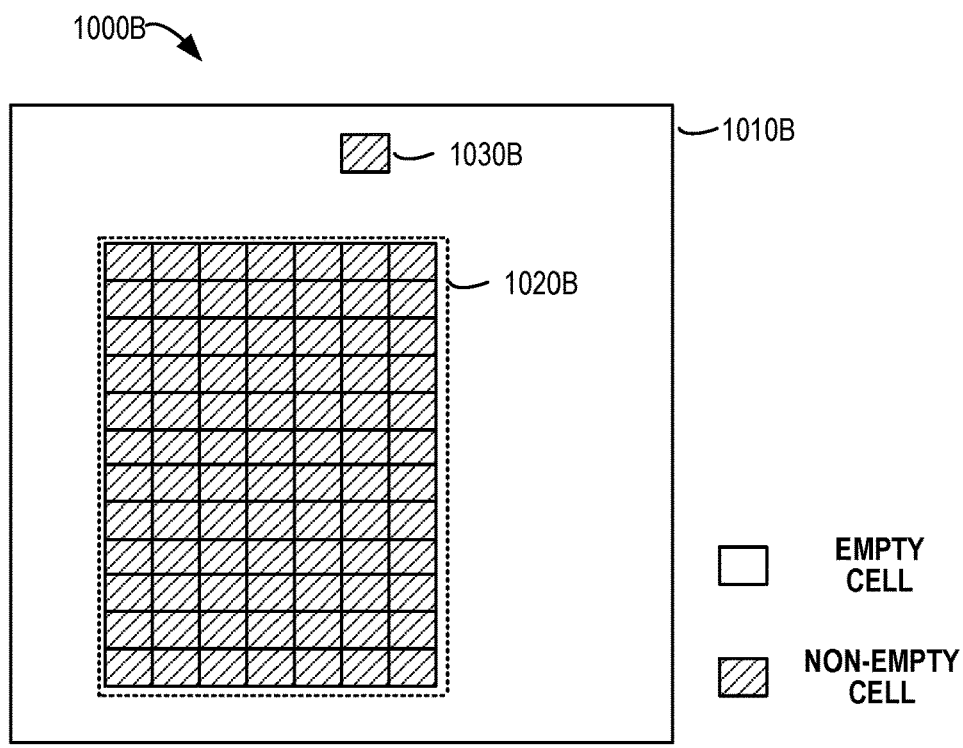
FIG. 10B illustrates a block diagram for determining whether an error exists in a candidate region based on a non-empty cell out of the candidate region according to implementations of the present disclosure.

FIG. 10B schematically shows a block diagram 1000B for determining whether an error exists in a candidate region based on non-empty cells out of the candidate region according to example implementations of the present disclosure. As depicted, blank legends represent empty cells, and shaded legends represent non-empty cells. A spreadsheet 1010B may be processed using the above described method, and a candidate region 1020B may be obtained. As shown in FIG. 10B, one or more non-empty cells 1030B exist out of the candidate region 1020B. In general, non-empty cells in the spreadsheet are supposed to belong to a certain table. Obviously, the situation as shown in FIG. 10B might indicate some non-empty cells are missed when processing the spreadsheet 1010B. Hence, it may be considered an error exists in the mapping relationship 420, on which basis the spreadsheet 1010B is processed, and needs to be corrected.

With the above example implementations, by identifying a real table in the spreadsheet 1010B and by updating the mapping relationship 420 with the identified real table and features of multiple cells in the spreadsheet 1010B, the error can be corrected effectively in the mapping relationship 420 which causes a larger number of empty cells to appear in the candidate region.

Example Implementations

Some example implementations of the subject matter described herein are listed as below.

In one aspect, the subject matter described herein provides a computer-implemented method. The method comprises: extracting respective multiple attributes of multiple cells comprised in a spreadsheet; determining respective features of the multiple cells based on the extracted multiple attributes; dividing the multiple cells into at least one candidate region based on the features; and determining at least one candidate table in the spreadsheet based on the at least one candidate region.

According to example implementations of the present disclosure, extracting respective multiple attributes of multiple cells comprised in the spreadsheet comprises: for a given cell among the multiple cells, extracting multiple attributes of the given cell based on at least one of: characters of data in the given cell, format of the data in the given cell, and style of the given cell.

According to example implementations of the present disclosure, dividing the multiple cells into the at least one candidate region comprises: obtaining a mapping relationship between a table in a spreadsheet and features of multiple cells comprised in the table, the mapping relationship being trained based on features of multiple cells comprised in a set of sample spreadsheets and multiple tables comprised by the set of sample spreadsheets; and determining the at least one candidate region based on the mapping relationship and the corresponding feature of the corresponding cells among the multiple cells.

According to example implementations of the present disclosure, determining the at least one candidate region further comprises: for a given candidate region of the at least one candidate region, adjusting a boundary of the given candidate region based on a matching degree of the given candidate region with the mapping relationship, so as to update the given candidate region.

According to example implementations of the present disclosure, there is further comprised: determining whether a potential error exists in a given candidate region of the at least one candidate region; obtaining at least one real table in the spreadsheet in response to determining a potential error exists in the given candidate region; and updating the mapping relationship based on the at least one real table and features of the multiple cells in the spreadsheet.

According to example implementations of the present disclosure, there is further comprised: obtaining information describing a probability that a candidate region of at least one candidate region obtained according to the mapping relationship comprises a table, and wherein determining whether a potential error exists in the given candidate region of the at least one candidate region comprises: determining a probability that the given candidate region comprises a table based on the information; and determining a potential error exists in the given candidate region in response to the probability being below a predefined threshold probability.

According to example implementations of the present disclosure, there is further comprised: obtaining information describing a probability that a cell in a spreadsheet is within a table, and determining whether a potential error exists in the given candidate region of the at least one candidate region comprises: determining a probability that a cell in the given candidate region is within a table based on the information; and determining the potential error exists in the given candidate region in response to the probability being below a predefined threshold probability.

According to example implementations of the present disclosure, determining whether the potential error exists in a given candidate region of the at least one candidate region comprises: determining the potential error exists in the given candidate region in response to the given candidate region overlapping with a further candidate region of the at least one candidate region.

According to example implementations of the present disclosure, determining whether the potential error exists in the given candidate region of the at least one candidate region comprises: determining a potential error exists in the given candidate region in response to an edge of the given candidate region comprising at least one of an empty row and an empty column.

According to example implementations of the present disclosure, determining whether the potential error exists in the given candidate region of the at least one candidate region comprises: determining whether the potential error exists in the given candidate region of the at least one candidate region based on a location relationship between a non-empty cell among the multiple cells and the given candidate region.

In another aspect, the subject matter described herein provides a computer-implemented device. The device comprises: a processing unit; and a memory, coupled to the processing unit and including instructions stored thereon, the instructions, when executed by the processing unit, causing the device to perform acts. The acts include: extracting respective multiple attributes of multiple cells comprised in a spreadsheet; determining respective features of the multiple cells based on the extracted multiple attributes; dividing the multiple cells into at least one candidate region based on the features; and determining at least one candidate table in the spreadsheet based on the at least one candidate region.

According to example implementations of the present disclosure, extracting respective multiple attributes of multiple cells comprised in the spreadsheet comprises: for a given cell among the multiple cells, extracting multiple attributes of the given cell based on at least one of: characters of data in the given cell, format of the data in the given cell, and style of the given cell.

According to example implementations of the present disclosure, dividing the multiple cells into the at least one candidate region comprises: obtaining a mapping relationship between a table in a spreadsheet and features of multiple cells comprised in the table, the mapping relationship being trained based on features of multiple cells comprised in a set of sample spreadsheets and multiple tables comprised in the set of sample spreadsheets; and determining the at least one candidate region based on the mapping relationship and the corresponding feature of the corresponding cells among the multiple cells.

According to example implementations of the present disclosure, determining the at least one candidate region further comprises: for a given candidate region of the at least one candidate region, adjusting a boundary of the given candidate region based on a matching degree of the given candidate region with the mapping relationship, so as to update the given candidate region.

According to example implementations of the present disclosure, there is further comprised: determining whether a potential error exists in the given candidate region of the at least one candidate region; obtaining at least one real table in the spreadsheet in response to determining a potential error exists in the given candidate region; and updating the mapping relationship based on the at least one real table and features of the multiple cells in the spreadsheet.

According to example implementations of the present disclosure, there is further comprised: obtaining information describing a probability that a candidate region of at least one candidate region obtained according to the mapping relationship comprises a table, and wherein determining whether a potential error exists in the given candidate region of the at least one candidate region comprises: determining a probability that the given candidate region comprises a table based on the information; and determining a potential error exists in the given candidate region in response to the probability being below a predefined threshold probability.

According to example implementations of the present disclosure, there is further comprised: obtaining information describing a probability that a cell in a spreadsheet is within a table, and determining whether a potential error exists in a given candidate region of the at least one candidate region comprises: determining a probability that a cell in the given candidate region is within a table based on the information; and determining a potential error exists in the given candidate region in response to the probability being below a predefined threshold probability.

According to example implementations of the present disclosure, determining whether the potential error exists in the given candidate region of the at least one candidate region comprises: determining the potential error exists in the given candidate region in response to the given candidate region overlapping with a further candidate region of the at least one candidate region.

According to example implementations of the present disclosure, determining whether the potential error exists in the given candidate region of the at least one candidate region comprises: determining the potential error exists in the given candidate region in response to an edge of the given candidate region comprising at least one of an empty row and an empty column.

According to example implementations of the present disclosure, determining whether the potential error exists in the given candidate region of the at least one candidate region comprises: determining whether a potential error exists in the given candidate region of the at least one candidate region based on a location relationship between a non-empty cell among the multiple cells and the given candidate region.

In a further aspect, the subject matter described herein provides a non-transient computer storage medium, comprising machine executable instructions which, when executed by a device, cause the device to execute a method in any of the above aspects.

In a still further aspect, the subject matter described herein provides a computer program product, tangibly stored on a non-transient computer storage medium and comprising machine executable instructions which, when executed by a device, cause the device to execute a method in any of the above aspects.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   extracting respective multiple attributes of multiple cells comprised in a spreadsheet;
   determining respective features of the multiple cells based on the extracted multiple attributes;
   dividing the multiple cells into at least one candidate region based on the features and a mapping relationship between a table in a spreadsheet and features of multiple cells comprised in the table, the mapping relationship being trained based on features of multiple cells comprised in a set of sample spreadsheets and multiple tables comprised in the set of sample spreadsheets to determine a probability that a table exists;
   determining at least one candidate table in the spreadsheet based on the at least one candidate region; and
   determining whether a potential error exists in the at least one candidate region based at least on probabilistic information describing the probability that the table exists in the at least one candidate region based on the mapping relationship.

2. The method of claim 1, wherein extracting respective multiple attributes of multiple cells comprised in the spreadsheet comprises:
   for a given cell among the multiple cells, extracting multiple attributes of the given cell based on at least one of characters of data in the given cell, format of the data in the given cell, or style of the given cell.

3. The method of claim 1, wherein determining the at least one candidate region further comprises:
   for a given candidate region of the at least one candidate region,
   adjusting a boundary of the given candidate region based on a matching degree of the given candidate region with the mapping relationship, so as to update the given candidate region.

4. The method of claim 1, wherein the determining whether the potential error exists in the at least one region comprises:
   obtaining at least one real table in the spreadsheet in response to determining a potential error exists in a given candidate region; and
   updating the mapping relationship based on the at least one real table and features of the multiple cells in the spreadsheet.

5. The method of claim 1, further comprising: obtaining information describing the probability that a given candidate region of at least one candidate region obtained according to the mapping relationship comprises the table, and wherein determining whether the potential error exists in the given candidate region of the at least one candidate region comprises:
   determining the probability that e given candidate region comprises the table based on the information; and
   determining the potential error exists in the given candidate region in response to the probability being below a predefined threshold probability.

6. The method of claim 1, further comprising: obtaining information describing an additional probability that a cell in a spreadsheet is within the table, and determining whether the potential error exists in a given candidate region of the at least one candidate region comprises:
   determining the additional probability that the cell in the given candidate region is within the table based on the information; and
   determining the potential error exists in the given candidate region in response to the additional probability being below a predefined threshold probability.

7. The method of claim 1, wherein determining whether the potential error exists in the at least one candidate region comprises:
   determining the potential error exists in a given candidate region of the at least one candidate region in response to the given candidate region overlapping with a further candidate region of the at least one candidate region.

8. The method of claim 1, wherein determining whether the potential error exists in the at least one candidate region comprises:
   determining the potential error exists in a given candidate region of the at least one candidate region in response to an edge of the given candidate region comprising at least one of an empty row and an empty column.

9. The method of claim 1, wherein determining whether the potential error exists in the at least one candidate region comprises:
   determining whether the potential error exists in a given candidate region of the at least one candidate region based on a location relationship between a non-empty cell among the multiple cells and the given candidate region.

10. A device, comprising:
    a processing unit;
    a memory coupled to the processing unit and including instructions stored thereon, the instructions, when executed by the processing unit, causing the device to perform operations comprising:
       extracting respective multiple attributes of multiple cells comprised in a spreadsheet;
       determining respective features of the multiple cells based on the extracted multiple attributes;
       dividing the multiple cells into at least one candidate region based on the features and a mapping relationship between a table in a spreadsheet and features of multiple cells comprised in the table the mapping relationship being trained based on features of multiple cells comprised in a set of sample spreadsheets and multiple tables comprised in the set of sample spreadsheets to determine a probability that a table exists;

determining at least one candidate table in the spreadsheet based on the at least one candidate region; and determining whether a potential error exists in the at least one candidate region based at least on probabilistic information describing the probability that a table exists in the at least one candidate region based on the mapping relationship.

11. The device of claim 10, wherein determining the at least one candidate region further comprises:

for a given candidate region of the at least one candidate region, adjusting a boundary of the given candidate region based on a matching degree of the given candidate region with the mapping relationship, so as to update the given candidate region.

12. The device of claim 10, wherein the determining whether the potential error exists in the at least one candidate region comprises:

obtaining at least one real table in the spreadsheet in response to determining a potential error exists in a given candidate region; and updating the mapping relationship based on the at least one real table and features of the multiple cells in the spreadsheet.

13. A non-transitory computer readable storage medium, on which a computer program is stored, the program, when executed by at least one processor, causes the at least one processor to perform operations comprising:

extracting respective multiple attributes of multiple cells comprised in a spreadsheet;

determining respective features of the multiple cells based on the extracted multiple attributes;

dividing the multiple cells into at least one candidate region based on the features and a mapping relationship between a table in a spreadsheet and features of multiple cells comprised in the table, the mapping relationship being trained based on features of multiple cells comprised in a set of sample spreadsheets and multiple tables comprised in the set of sample spreadsheets to determine a probability that a table exists;

determining at least one candidate table in the spreadsheet based on the at least one candidate region; and determining whether a potential error exists in the at least one candidate region based at least on probabilistic information describing the probability that a table exists in the at least one candidate region based on the mapping relationship.

* * * * *